United States Patent [19]

Saugstad et al.

[11] 4,171,725
[45] Oct. 23, 1979

[54] ROTARY HARROW

[76] Inventors: Osten E. Saugstad, 1020 Clinton Rd., Sacramento, Calif. 95825; Osten E. Saugstad, Jr., 119 5th St., Woodland, Calif. 95695

[21] Appl. No.: 777,777

[22] Filed: Mar. 15, 1977

[51] Int. Cl.² .............................................. A01B 33/06
[52] U.S. Cl. ........................................ 172/59; 172/68; 172/72; 172/81; 172/512
[58] Field of Search ...................... 172/59, 68, 71, 72, 172/47, 48, 49, 512, 81, 63, 552

[56] References Cited

U.S. PATENT DOCUMENTS

| | | | |
|---|---|---|---|
| 1,132,152 | 3/1915 | Bell | 172/543 |
| 1,433,249 | 10/1922 | Trumbull | 172/512 |
| 2,582,364 | 1/1952 | Tice | 172/49 |
| 2,805,614 | 9/1957 | Lipetzky | 172/512 |
| 3,155,169 | 11/1964 | Mattson | 172/51 |
| 3,316,865 | 5/1967 | Williams | 172/72 |
| 3,437,061 | 4/1969 | Wells | 172/81 |
| 3,483,929 | 12/1969 | MacIntyre | 172/59 |
| 3,538,987 | 11/1970 | Taylor | 172/68 |
| 3,821,989 | 7/1974 | Lely | 172/59 |
| 3,885,633 | 5/1975 | Lely | 172/117 |
| 3,897,831 | 8/1975 | Lely | 172/59 |
| 3,899,029 | 8/1975 | Lely | 172/59 |
| 3,899,030 | 8/1975 | Lely | 172/68 |
| 4,003,437 | 1/1977 | Lely | 172/59 |
| 4,014,272 | 3/1977 | Lely | 172/59 |
| 4,018,170 | 4/1977 | Lely | 172/59 |

FOREIGN PATENT DOCUMENTS

| | | | |
|---|---|---|---|
| 2166742 | 11/1975 | Fed. Rep. of Germany | 172/59 |
| 2557244 | 7/1976 | Fed. Rep. of Germany | 172/68 |
| 2641687 | 3/1977 | Fed. Rep. of Germany | 172/59 |
| 2274207 | 1/1976 | France | 172/63 |

*Primary Examiner*—Richard J. Johnson
*Attorney, Agent, or Firm*—Mark C. Jacobs

[57] ABSTRACT

Improvements in rotary harrows whereby an odd number of soil-working members are rotatably journalled thereon, the members having an even number on each side of a gear box located over one of the members, the gear box being in driving engagement with mechanism for rotating all of the members. The soil-working members include downwardly extending soil engaging tines removably mounted on the harrow, some of the tines differing in length than other of the tines. Shaper plates may be provided before the conventional roller of the harrow and improved crowders may be provided between the tines and the shaper plates. Tunnels to protect plants may also be provided between the tines and the plates aligned with spacing therebetween. Side shields may also be provided on the harrow for containing soil or the like within the area being plowed by the harrow.

12 Claims, 18 Drawing Figures

ROTARY HARROW

BACKGROUND OF THE INVENTION

1. Field of the Invention

The invention relates to rotary harrows; and, more particularly, to harrows comprising a plurality of tined soil-working members in side-by-side relationship.

2. Description of the Prior Art

Harrow machines are well known in the farming industry. One such machine, and improvements thereon, is described in U.S. Pat. Nos. 3,899,029 and 3,821,989 to Van Der Lely et al. One of the problems encountered in using such prior art machines is the tremendous vibrations that take place since this machine utilizes an equal total number of rotating tines and the power transfer to such tines is mounted over one of the rotors which rotate the tines. This results in an uneven balance on both sides of the machine. That is, there is more power to the side of the prior art Van Der Lely et al. machines having the lesser number of rotors. More power is necessary to drive the gears for the rotors on the side having the extra rotor. This results in a power lag which causes a vibration in the gear box system of the Van Der Lely et al. machine.

The Van Der Lely et al. machines always contemplate the use of an even number of sets of tines turning clockwise as are turning counterwise. The intent of the prior art Van Der Lely et al. machine is to have no vibration when working the ground. However, in practice, the aforementioned power lag affects the gear box and can shake the machine apart.

Also, with the prior art Van Der Lely et al. machines, there is no way to perform close cultivation since all of the tines are of the same length. If one removed rotors of such prior art machines, a distance of about 20" around a plant would be left which is too great for good cultivation. There would be no way of cultivating in between the beds.

SUMMARY OF THE INVENTION

It is an object of this invention to provide an improved harrow machine.

It is a further object of this invention to provide an improved rotary harrow machine having the power to the rotors evenly balanced on both sides of the power drive thus resulting in little or lessened vibration on the power drive for the rotors.

It is still another object of this invention to provide tines of varying lengths so that better cultivation is possible.

It is a further object of this invention to provide an improved crowder for such harrows.

It is still another object of this invention to provide improved soil smoothing means for such harrows.

These and other objects are preferably accomplished by providing an odd number of soil-working members rotatably journalled on the harrow, the members having an even number on each side of the gear box which is located over one of the members, the gear box being in driving engagement with mechanism for rotating all of the members. The soil-working members include downwardly extending soil engaging tines removably mounted on the harrow, some of the tines differing in length than other of the tines. Shaper plates may be provided before the conventional roller of the harrow and improved crowders may be provided between the tines and the shaper plates. Tunnels to protect plants may also be provided between the tines and the plates aligned with spacing therebetween. Side shields may also be provided on the harrow for containing soil or the like within the area being plowed by the harrow.

DESCRIPTION OF THE PREFERRED EMBODIMENT

Figure 1:
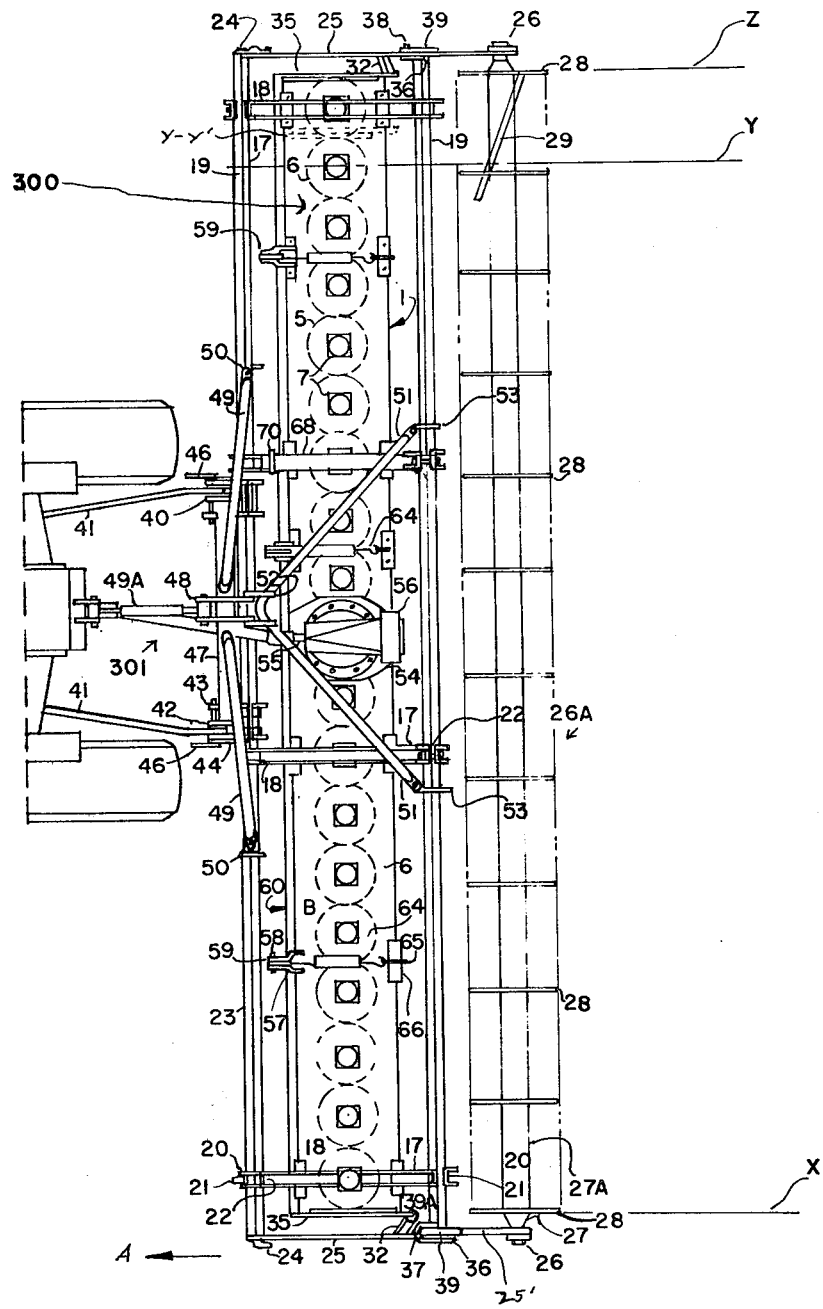
FIG. 1 is a plan view of a harrow of the prior art, composited with teachings of this invention, mounted at the rear of a tractor.

Referring to FIGS. 1, 2, 3 & 17, the soil cultivating implement or rotary harrow which is illustrated includes a main frame part 1 of hollow box-like configuration that extends substantially horizontally perpendicular to the intended direction of operative travel of the harrow which is indicated by an arrow A in the Figures of the drawing. The bottom of the main frame part 1 is provided with a plurality of regularly spaced apart substantially vertical bearings 2. As particularly contemplated in the present invention, balancing means are provided to balance equally the power to these vertical bearings 2. In the exemplary embodiment, such means includes providing an odd number of vertical bearings 2, as for example, nineteen in the illustrated embodiment. As will be discussed further, these bearings 2 are equally distributed on each side of the power source to the bearings 2. Each bearing 2 receives a corresponding substantially vertical rotary shaft 3 which is provided, at its lower end, with a corresponding soil working member that is generally indicated by the reference numeral 4. The nineteen rotary shafts are arranged in a single row that extends substantially perpendicular to the direction A and it is preferred that the axis of rotation of each shaft 3 should be spaced from its neighbor, or each of its neighbors, by a preferred distance, e.g. substantially 25 centimeters. Although our invention can be carried out with any suitable number of members 4, the total must be odd and nineteen are preferred.

Each shaft 3 is provided, inside the hollow main frame part 1, with a corresponding spur-toothed pinion 5, the nineteen pinions 5 being arranged in intermeshing engagement in the manner shown in outline in FIG. 1. A substantially horizontal plate 6 affords the top of the main frame part 1 and is releasably secured to the remainder of part 1 by bolts with the provision of an intervening gasket so as to substantially close off the interior of the part 1 and prevent contamination of the lubricant contained therein by external dirt. The plate 6 is provided with nineteen substantially vertical bearings 7 that are mounted in openings in the plate 6 in substantially vertical alignment with corresponding bearings 2. The ends of the nineteen shafts 3 are rotatably received in bearings 7. Each soil-working member 4 comprises a corresponding substantially horizontal support 8 secured to the lowermost end of the corresponding shaft 3 that projects from beneath the corresponding bearing 2. The opposite ends of each support 8 carry substantially vertical tine holders 9 whose axis extend parallel to the axes of rotation of the shafts 3. Each holder 9 receives an upper fastening portion 10 of a corresponding rigid tine. In order to prevent the tines from turning in their holders 9, the fastening portions 10 are provided with at least one laterally projecting lug or rib 12 that is lodged in a corresponding groove or recess at the foot of the tine holder 9. The upper end of the fastening portion 10 of each tine 11 is screw-threaded and receives a nut 14 by which the tine can be clamped securely, but releasably, in its holder 9. The nuts 14 may incorporate nylon or the like to prevent them from being worked loose by vibration during use.

Figure 3:
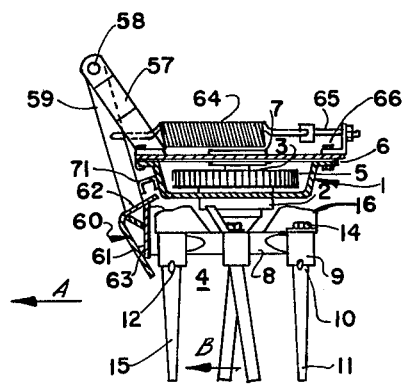
FIG. 3 is a section, to an enlarged scale, taken on the line III—III of FIG. 1.

The tines may be oriented as shown in FIG. 3 of the drawing and as discussed in detail in Column 2, lines 18 et seq. of U.S. Pat. No. 3,821,989, the teachings of this patent being incorporated herein by reference. The fastening portions 10 may also be configured as discussed in U.S. Pat. No. 3,821,989.

Figure 16A:
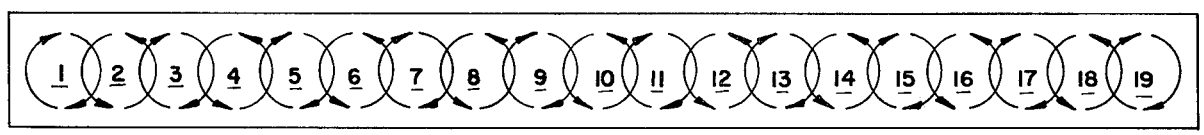
FIGS. 16A and B depict rotor assembly configuration & tine configuration for the improved harrow of this invention.
Figure 16B:
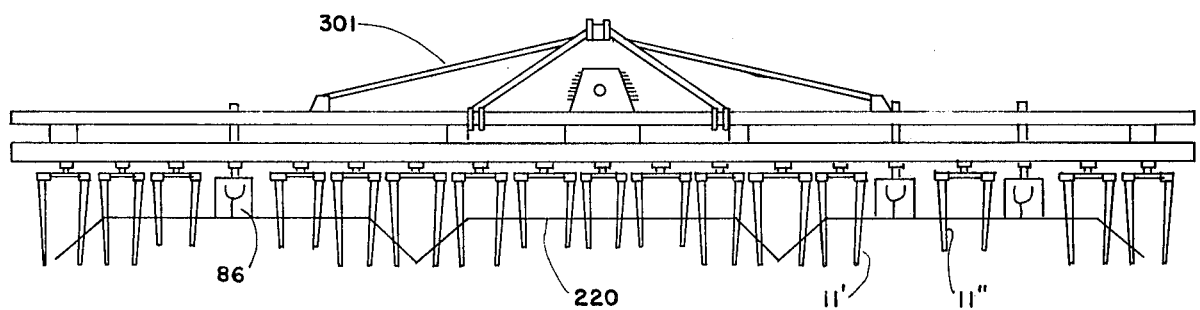

As particularly contemplated in the present invention, all of the tines 11 include improved cultivating means which is accomplished by having tines 11 of different overall lengths. For example, as seen in FIG. 16B the longer tines 11', e.g., 12" or so in overall length, work deep furrows, the standard or short length tines 11", e.g. about 9" in overall length, work the top of the bed. In this manner, the tine holders 9 are centered over the tops of the plants on the bed. Thus, the improved machine can cultivate single and double rows without removing rotors as in the prior art Van der Lely et al machines. Thus, no empty space is left around a plant which space cannot be cultivated in the prior art machines. By interchanging the differently sized tines, different sized beds can be overlapped. In using the prior art Van der Lely et al machines to cultivate 15 foot wide beds which is a standard bed in certain parts of the country, as in California, such prior art machine is only available for that standard sized bed in a working width of 14 feet, 8 inches. By adding the tines of our invention, we now have a working width of, for example, 15' 6", so we can overlap the area on the outside of our machine and cultivate a "guess row" which is necessary for herbicide techniques. The prior art Van der Lely et al machines did not leave a guess row large enough to accomplish the herbicide techniques.

Also, as discussed heretofore, the tines 11 are removable and interchangable for reasons to be discussed hereinbelow.

A plate 16 is provided at the top of each tine holder 9 and is inclined to the vertical in an upward and forward direction with respect to the intended direction of rotation B. These plates 16 shield nuts 14 as discussed in U.S. Pat. No. 3,821,989. Four supports 17 that extend substantially parallel to the direction A are provided on top of the main frame part 1 at equal distances apart from one another across the width of the harrow with the central pair of the two supports spaced at opposite lateral sides from the midpoint of the main frame part 1. Each support 17 includes two vertically disposed and laterally spaced plates 18 that are formed at both their leading and rear ends, with respect to direction A, with angular recesses in which fit matchingly profiled beams 19 of angular cross-section. These beams 19 extend generally perpendicular to direction A. Transverse members 22 of angular cross-section extend between the recesses in the plates 18 at the front and the rear of those plates and the detachable beams are urged into the recesses and against the transverse members 22 by clamps 20 that are retained in their clamping positions by bolts 21. Each beam 19 is parallel to a substantially horizontal line that intersects the axes of rotation of all the shafts 3 and has a length in a horizontal direction perpendicular to the direction A which is as great as the total working width of the harrow, that is, the combined working width of the nineteen soil-working members 4 which members work overlapping strips of ground. The rearmost of the two beams 19 is located at a higher horizontal level than the foremost one and the supports 17 and beams 19 together form a supporting structure 23 that is located generally above the main frame part 1. The two ends of the leading beam 19 are provided with lugs 24 which are inclined downwardly and rearwardly with respect to direction A, from the leading beam 19. The lowermost and rearmost ends of the two lugs 24 are connected by horizontal pivot pins that define an axis extending substantially perpendicular to the direction A to the leading ends of corresponding arms 25 that are inclined downwardly from the lugs 24 and rearwardly with respect to the direction A. The rearmost end of each arm 25 carries a horizontal bearing 26 and the two bearings 26 receive stub shafts 27 at the opposite ends of a rotary soil compressing member in the form of a roller 26A. The stub shafts 27 project from the opposite ends of a central tube 27A of the roller 26A, the tube 27A being provided at its opposite ends and at regular intervals along its length with a plurality of substantially vertically disposed plates 28 whose shapes can be seen best in FIG. 2. Each plate 28 has its plane disposed perpendicular to the axis of rotation defined by the two stub shafts 27.

Plates 28 are formed, adjacent their peripheries, with a plurality of holes, such as eight, through which elongated tubular elements 29 are entered, said elements 29 being retained against appreciable longitudinal displacement with respect to the plates 28 by quickly releasable transverse pins 30 but it will be noted that the holes in the plates 28 receive the elements 29 with some degree of play so that the elements 29 can turn in those holes.

Figure 2:
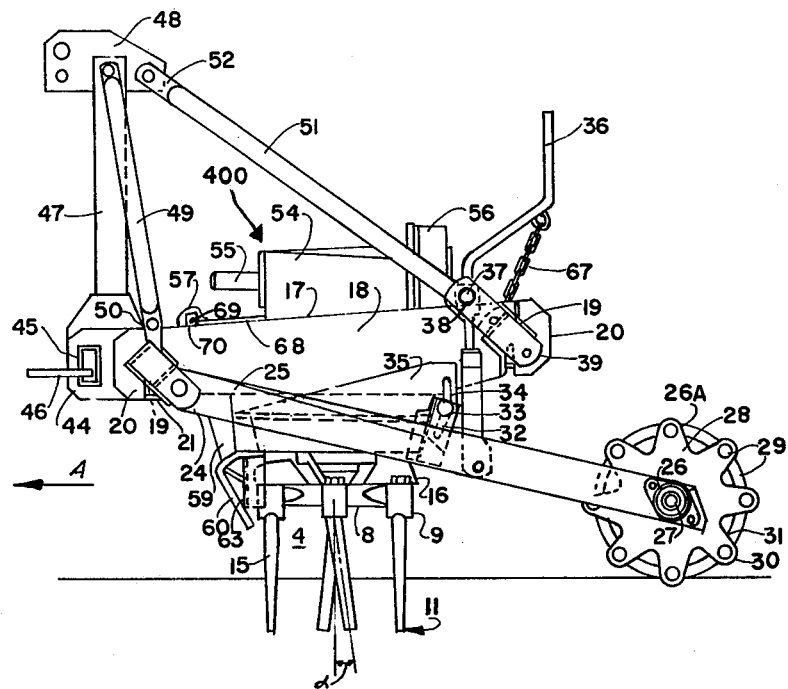
FIG. 2 is a side elevation, to an enlarged scale, as seen in the direction indicated by an arrow A in FIG. 1.

As seen in FIG. 2, each plate 22 is formed with generally V-shaped recesses 31 between the portions thereof that are formed with the holes receiving the elongated elements 29. These elements may be arranged as disclosed in U.S. Pat. No. 3,821,989. Each of the two arms 25 carries a corresponding upwardly directed bracket 32 whose upper end carries a transverse bolt 33 that passes through an arcuate slot 34 in a substantially vertical plate 35 fastened to the corresponding end of the main frame part 1. Nuts are also provided for bolts 33 and these constitute locking means as described in detail in U.S. Pat. No. 3,821,989, the teachings of which are incorporated herein by reference. Each arm 25 is connected by a pivot pin to a spindle 36 received in a block 37 mounted by pins 38 between two supports 39 and 39A, all as discussed in U.S. Pat. No. 3,821,989.

The front of the leading beam 19 of structure 23 is provided with coupling means 40 for connection to the lifting links 41 of a three-point hitch on the tractor, as discussed in U.S. Pat. No. 3,821,989. The coupling means includes plates 42 (FIG. 1) through 44 formed with slots 45 and pins 46 and the plates are mounted at the foot of a tripod 47 having coupling means 48 at its apex, the operation and function of these elements being described in detail in Col. 4, line 37 et seq. of U.S. Pat. No. 3,821,989 and resort should be made thereto for a complete understanding of these elements.

The apex of tripod 47 is connected by rods 49 with bracket 50 fastened to the leading one of beams 19 with respect to direction A. A Vee-shaped support 51 is arranged between lugs 52 projecting rearwardly from means 48 and brackets 53 secured to the rearmost beam 19, the support 51 being entered through openings in lugs 52. Nuts and bolts may be provided where desired in the manner discussed in Col. 5, line 7-12 of U.S. Pat. No. 3,821,989. Collectively, these parts are hitch 301.

The shaft 3 of one of the central pair of members 4, that is, the mid or nineteenth one, has an upward extension beyond bearing 7 into a gear box 54. This extension, not visible, is in driven connection with a splined or keyed input shaft 55 by way of a change-speed gear assembly 56 mounted at the rear of gear box 54. The gear assembly 56 may be identical to that described, and its operation, in Col. 5, line 21 to 37 of U.S. Pat. No. 3,821,989 and reference may be made thereto for a complete understanding of the invention. See FIG. 2.

Figure 17:
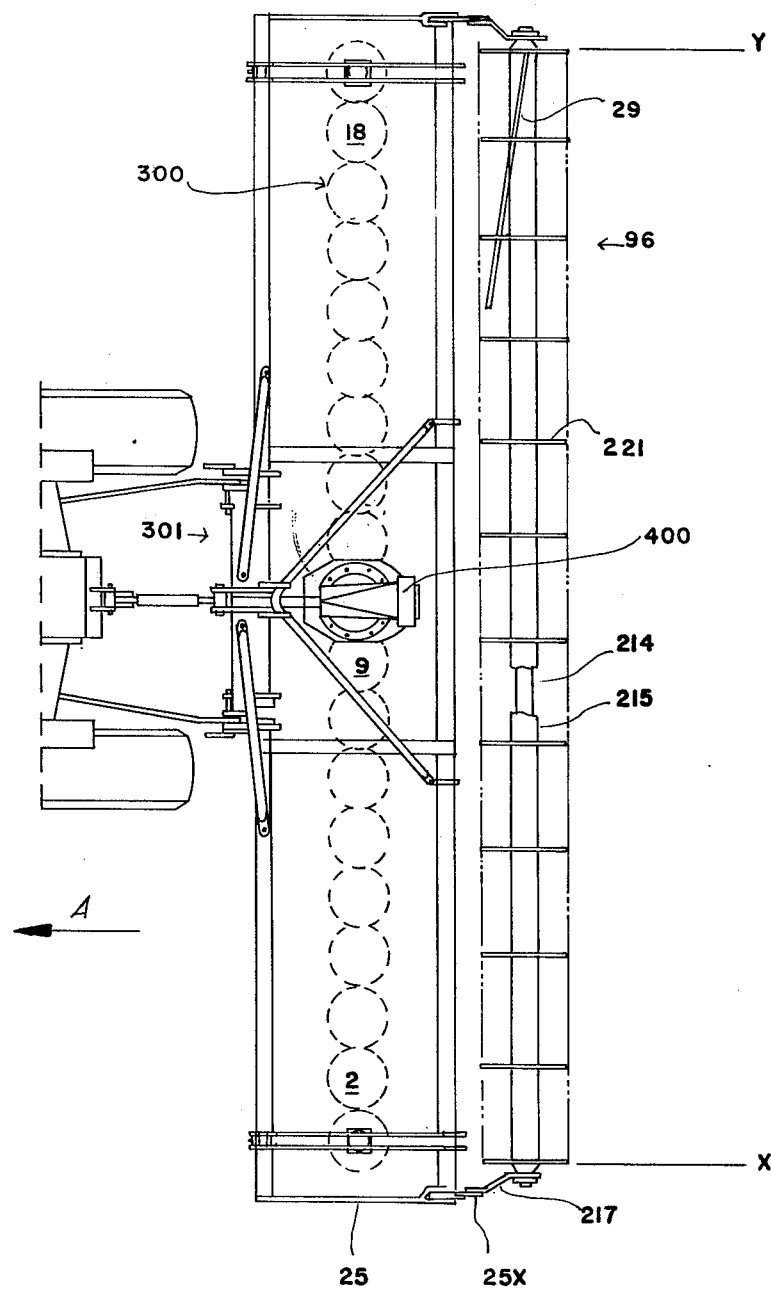
FIG. 17 is an abbreviated plan view of the harrow of this invention showing the modified roller of this invention attached behind the harrow.

It is seen in FIGS. 1 & 17 that the gear box 54 is located over the 10th rotor, such that for this invention's purpose an even number is spaced on each side of the gear box 54. That is, since nineteen such holders 9 is preferred, nine are provided on each side of gear box 54, the gear box 54 being located directly over the middle or nineteenth tine holder 9. This equally distributes or evens out the power required to rotate the tine holders 9 resulting in a significant reduction of vibration on the gear box 54 as opposed to prior art harrows.

Pairs of lugs 57 which are inclined upwardly and forwardly with the respect to direction A are provided at the front of the main frame part 1, the pairs of lugs 57 being spaced inwardly from the opposite ends of the main frame part 1 by distances preferably equal to the working widths of two of the soil-working members 4. Each pair of lugs 57 has a corresponding arm, FIG. 3, 59 pivotally connected to its leading upper end by a pin 58 that lies above the frame part 1 and extends substantially horizontally perpendicular to the direction A. The arms 59 extend downwards from the pins 58 and their lower ends have a single screening element 60 welded or otherwise rigidly secured to them. Element 60 includes a lower portion 61 extending upwardly and forwardly from its lower edge, portion 61 merging by way of a bend of substantially 90° into an upper portion 62 that is inclined and rearwardly with respect to direction A away from the bend towards its upper edge. Strip 63 interconnects the rear surfaces of the two portions 61 and 62 of the screening element 60 and has its opposite lateral ends bent over rearwardly as in FIGS. 2 and 3. Helical tension springs 64 have their leading ends connected to the arms 59 at locations approximately midway between the pivot pins 58 and the screening element 60 to which both arms are secured. Springs 64 may be connected to adjusters 65 having nuts bearing against brackets 66 all in the manner discussed in Col. 11. 3-11 of U.S. Pat. No. 3,821,989.

The details recited above are equally applicable for both the prior art even number rotor assembly harrow and the improved odd number rotor assembly harrow of this invention, except where specifically designated to the contrary.

Thus FIG. 1 of U.S. Pat. No. 3,821,989 which is incorporated herein by reference including all of the details pertaining to the Figure shows the prior art even number rotor assembly harrow with a standard roller 26A behind it.

FIG. 1 herein is a composite view of the instant invention and the prior art machine with the even number rotor segment shown between lines X and Y. The added rotor section is seen to be between lines Y and Z. The phantom lines Y-Y' represent the right end of the prior art machine and the solid lines represent the actual terminus with the extra rotor added.

The roller shown in FIG. 1 is a standard roller 26A which would terminate also at line Y, but which has been extended an amount equal to the extra rotor. The mounting means of FIG. 1 is that of the prior art, i.e. with straight arms. However, in accordance with the instant invention, the roller is shown moved rearwardly using extension arms 25'.

The hitch in FIG. 1 is shown in the prior art position. The relative location of the hitch is in accordance with this invention is shown in FIG. 17. In view of the incorporation by reference of the details of FIG. 1 of U.S. Pat. No. 3,821,989 certain reference numbers of FIG. 1 herein have not been discussed, especially since the same numbering system has been employed such that like parts of FIG. 1 of U.S. Pat. No. 3,821,989 have the same reference numbers in FIG. 1 and in other figures of the application.

The instant invention is shown in its entirety in FIG. 17. The modified roller with offset mounting arms 217 and moved rearwardly is shown there too. However, for ease of graphic illustration the helical members have been omitted in FIG. 17 but if present would appear as in FIG. 9.

The hitch 301's tie bar has been moved laterally in FIG. 17 to be aligned centrally with the drive means in accordance with the teachings of this invention. This is discussed infra in detail. The odd number rotor is shown installed in place in this view.

OPERATION OF THE HARROW

The operation of the harrow of the instant invention is identical, except where otherwise described, to that of the prior art Van der Lely et al harrow of U.S. Pat. No. 3,821,989, the teachings of which are incorporated herein by reference. Thus, the operation described in Col. 6, 1.12 through Col.7, 1.52 of U.S. Pat. No. 3,821,989 is also incorporated herein by reference and reference should be made to that patent for a full understanding of the invention. Further, the chains 67, cover 68, dowel 69 and pin 70 may also be provided as discussed in Col. 6, 11.44-52 and Col. 7,11.12-17 of U.S. Pat. No. 3,821,989. Of course, the working width of the instant harrow differs as, for example, being approximately 5 meters for a 19 rotor harrow.

Figure 4:
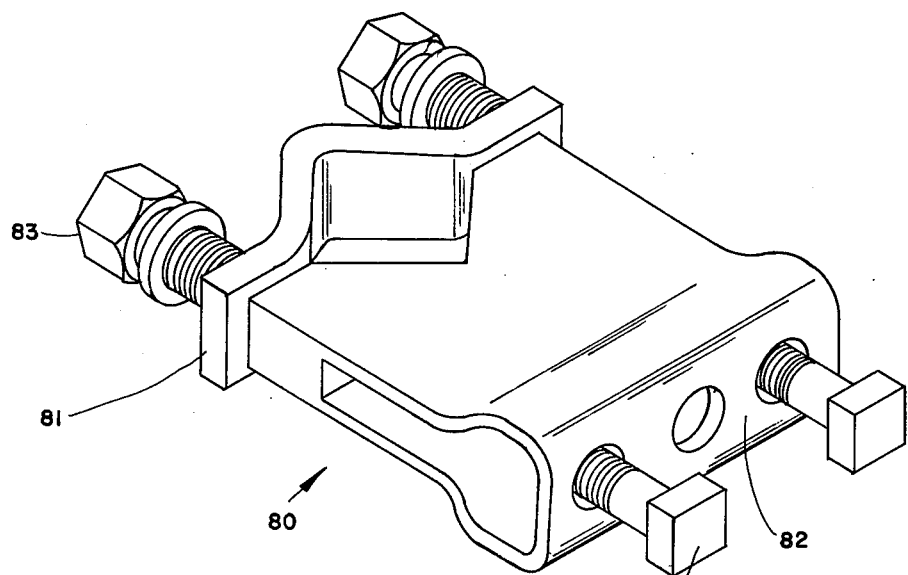
FIG. 4 is a perspective view of a clamp for coupling various components to the harrow of FIGS. 1–3.
Figure 5:
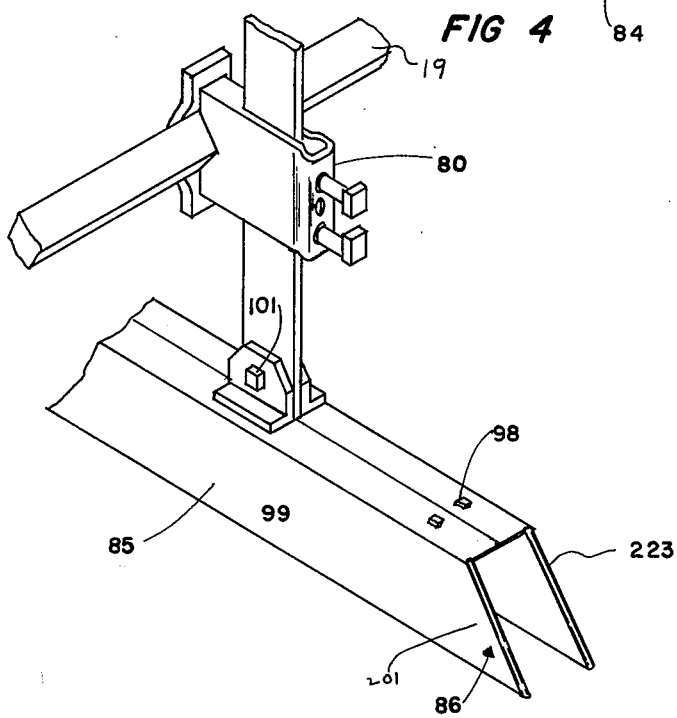
FIG. 5 is a perspective view showing one added component installed on the harrow of FIGS. 1–3, namely a tunnel.

The aforementioned beams 19 in FIG. 2 may be provided with suitable clamps 80 as shown in FIG. 4 which can be quickly and easily bolted to beams 19. Thus, each clamp 80 may have a removable clamping bracket 81 threadably coupled to a C-shaped sleeve or main body portion 82 by threaded bolts 83. Abutting bolts 84 are threaded in suitable apertures in main body portion 82. As can be seen in FIG. 5, beams 19 are clamped via bracket 81 and bolts 83 to clamps 80 and vertically extending brackets 85 are inserted into main body portion 82 and held in position by tightening bolts 84 into abutment thereagainst. In this manner, accessories, as will be discussed, may be quickly and easily mounted on the improved harrow machine since, obviously, any suitable attachment may be carried at the lower end of brackets 85.

ACCESSORIES—TUNNELS

Thus, as particularly contemplated in the present invention, tunnel forming means may be provided. This is accomplished by removing tines 11 where such tunnel forming means are desired and clamping tunnels 86 via brackets 85 to clamps 80 as shown in FIG. 5. Thus, in addition to cultivation, the machine disclosed herein may shape the beds being cultivated and protect the plants.

Per FIG. 5, tunnels 86 have a triangular leading edge, 201, wherein the hypotenuse slants downwardly and forwardly from the main portion of the tunnel 86. These leading edges 201 are intended to fold plant leaves back into the tunnel such that the young plants are not disintegrated by impingement of the tunnel body upon them. Each hypotenuse of said triangle 201, has a top, 223 surface of 0.5 inch round bar stock welded thereon, though the dimension is not critical. This curvature helps to force the leaves back into the tunnel as is desired. Also the problem of prior art tunnels of picking up dirt clods is avoided by use of this unique structure. Tunnels 86 comprise inverted U's with leading edges 201 above.

Figure 13:
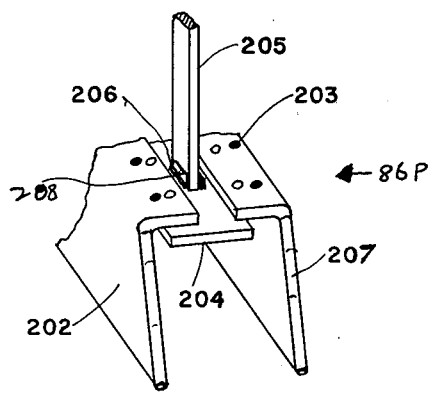
FIG. 13 is a perspective view of a preferred embodiment of a tunnel of this invention.

A preferred embodiment for the tunnels of this invention is shown in FIG. 13. The tunnel seen here is capable of lateral extension, which allows the tunnel width to be adjusted to accomodate plants whose leaves are spread out further than other plants. This tunnel 86P is seen to comprise two inverted spaced apart L shaped members 202, with horizontal plate 204 disposed beneath both of the base portions of said L's. Upstanding brackets or standards 205 are vertically disposed generally, between flanges 206, and are held in place by a suitable pin or bolt not shown. L shaped members 202 may be laterally extended by the change in placement of bolts 203. Obviously should there be a specific reason, each side can be extended an indpendent amount from the other side. While two locations of each L are shown in the figure, obviously more can be employed. Heretoo, the preferred version of tunnel 86P is seen to have the leading triangular front portion with the round stock 207 secured thereon. Optionally half round stock may be substituted for 207 with substantially similar results. Note that holes in 204 for bolts 203 are not seen.

It is seen that a single bolt is inserted through the spaced apart flanges 206 and through standard 205 through suitable aligned openings. A nut not shown is used to secure this bolt, 208. It is seen therefore the standard is somewhat pivotally mounted, if the bolt is not tightened securely. This is beneficial in that oftimes one may desire to tilt the tunnel slightly with respect to the harrow 1, such as during herbicide incorporation, prior to securely fastening each bolt 208 in place. Additionally, one can compensate for manufacturing errors, by the use of such a mounting system, in that every tunnel may not be a carbon copy of the next.

It is also within the scope of this invention to provide tunnels 86P of a reverse configuration in that plate 204 is disposed above both of the base portions of the inverted L's 202. The alignment of the bolts 203 through suitable apertures in both members would be the same. Note too that tunnels 86 are also pivotally mounted, using 1 pivot bolt 101 for each of the two standards of same, inserted through spaced apart flanges 206, in the manner above.

Figure 12:
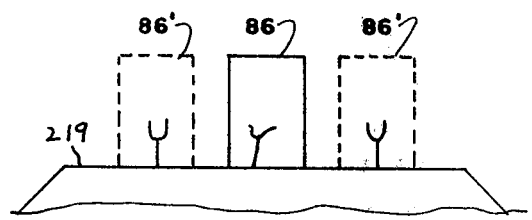
FIG. 12 is a top plan diagrammatic view illustrating the relative location of tunnels vis a vis plants on beds.

In FIG. 12, it is depicted how the tunnels 86 may be placed for either single or double row planting. Tunnel 86, in solid lines is used in single row planting and tunnels 86' in dotted lines, are used if double rows are desired. Tines 11 aligned with the tunnels 86 or 86' are removed. When the tunnels of this invention are employed with the improved odd number rotor harrow of this invention, tines 11' and 11" are also removed. This is discussed in detail in the section of this application that relates to the tine configuration of our improved harrow for cultivation, with particular reference to FIG. 16.

In recapitulation, it is seen that while the improved tunnels 86 and 86P of this invention may be employed with the prior art rotary harrow, though not well, they can perhaps also be employed with rotary harrows of other manufacturers with some success, they are intended primarily to function as an integral part of the overall improved odd number rotor assembly harrow of this invention.

SIDE SHIELDS, CROWDERS, AND SHAPER PLATES

Figure 6:
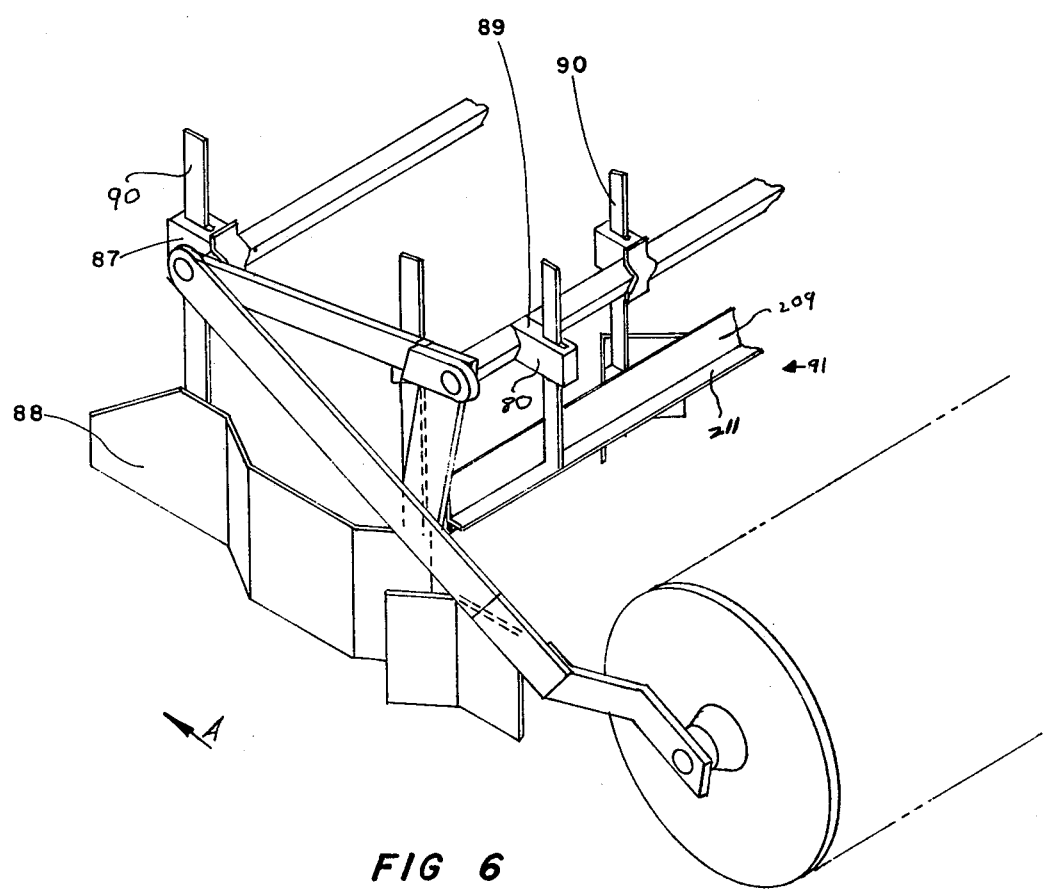
FIG. 6 is a perspective view of another added component installed on the harrow of FIGS. 1–3, namely a side shield.
Figure 7:
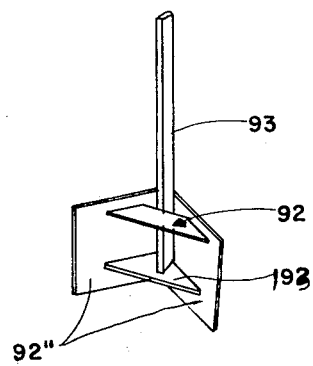
FIG. 7 is a perspective view of a crowder installed on the harrow of FIGS. 1–3.

As shown in FIG. 6, arms 25 may include brackets 87 receiving therein vertical support members 90 supporting side shields 88. Like brackets 89 may be provided on beams 19 also receiving like vertical support members 90 supporting the forward end of side shields 88. These side shields 88 serve to contain the area therebetween (one shield 88 on each side of the harrow machine) being worked so that nothing, such as chemicals, can escape. Also, dirt is contained between shields 88. The shields 88 are solidly and firmly mounted to the framework.

Figure 8:
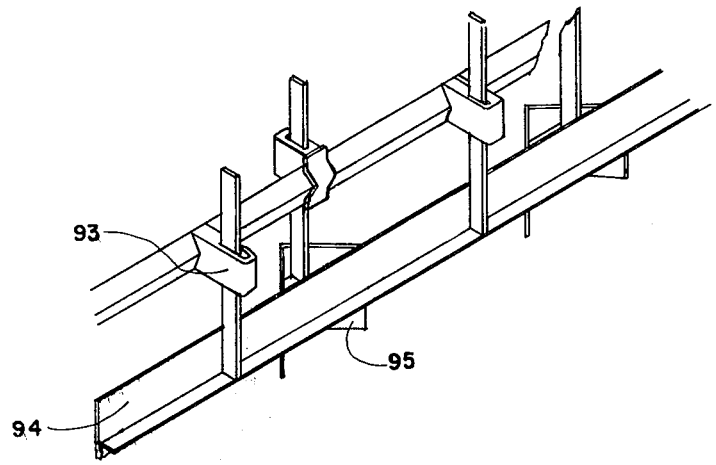
FIG. 8 is a perspective view of a modified component installed on the harrow of FIGS. 1–3.

As shown in FIG. 8, clamped to beams 19 in like manner as tunnels 86 are a plurality of spaced elongated shaper plates 91. Such plates 91 shape the top of the bed and leave everything perfectly smooth. They level the soil and leave it planed.

A plurality of spaced triangularly-shaped elements or crowders 92, the apices extending in the direction A, may be individually mounted via vertical brackets 93 and clamps 80 to beams 19. The crowders 92 make the furrows and the shaper plates 91 level everything on top. The roller 26A firms everything back up after it goes over the shaped and smoothed furrows.

Figure 14:
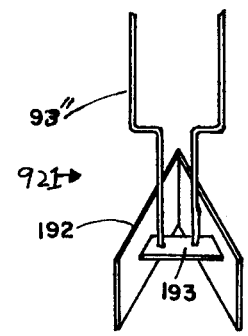
FIG. 14 is a top perspective view of a central crowder of this invention.

Crowders 92 are seen to be of three distinct types, namely left oriented, or left offset; central; and right offset. The left offset units have the vertical bracket or standard welded toward the left side face 92" of triangular shaped body portion. Right offset units have the standard 93 depending vertically up ward from the right side. Central crowders are seen to have either one vertically depending standard 93 positioned along the bisector of the front angle of the body portion, of a pair of standards 93 parallel disposed, spaced apart sidewise, with each standard depending upwardly, then outwardly an amount less than the initial upward disposition, then upwardly again, the two together forming a structure that resembles a shield. Reference is had to FIG. 14. There is no separate significance to the orientation of the standard(s) 93 other than to say that the disposition is dependent upon where the particular crowder is to be positioned upon tool bar 19, vis a vis other items mounted thereon such as tunnels 86 and the like.

It is seen that crowder 921 has a front apex angle of slightly less than 90°, for the junction of the two upstanding plates. It is preferred that a portion of these two plates 192, be hardfaced, a term known to the art. Horizontal member 193 interconnects the rear portions of the upstanding plates 192. Standard 93" is connected both to 193 and the inside surface of 192.

The angle of the sides of crowders 92 and 95 may be slightly less than 90 degrees with respect to the vertical. If desired, one side may be offset from the other. Support flanges 193 may interconnect the side faces 92". The sides are essentially vertical as opposed to prior art ditchers or the like which left dirt instead of putting it onto a bed as in our machine. No change in the level of distribution of the dirt takes place. The soil is not plowed but merely pushed straight out. Untreated dirt is not mixed with treated dirt.

The crowders of the instant invention are seen to be a significant improvement over the Hawkins Row Crop ditcher described and claimed in U.S. Pat. No. 3,713,497. That unit lifts the dirt the up and puts the removed dirt onto the top of the bed. We on the other hand just push the dirt aside onto the sides of the bed, not on top of it. Thus we do not change levels of distribution. Thus incorporated herbicide for instance is not disturbed or covered over on the bed top, by added dirt. We also differ from the action of the devices known as listers to the trade, which also lift the dirt up, due to their configuration, and place it on the bed top. Again, disturbing the relative location of materials. Our unique design merely pushes the dirt slightly aside, thereby avoiding a possible mixture of treated with untreated dirt.

Figure 11:
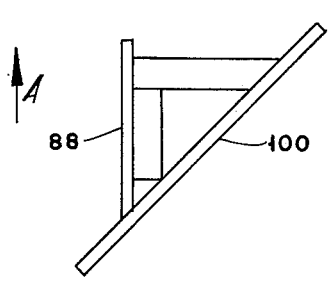
FIG. 11 is a top plan view of a portion of the added component of FIG. 7, a half crowder.

As shown in FIG. 11, one-half of a crowder 92 may be used in conjunction with each shield 88 (i.e. half-crowder 100). This contains the dirt within the area being plowed. They catch the dirt and move it to a full crowder 92 into a bed and just barely rub the ground. Tunnels 86 may be used independently of the plates 91 or crowders 92, and vice versa.

Turning now to the details of the shaper plates, it is seen that these are used to haul the dirt in between the crowders, 95, and after the plants have grown, and the tunnels are being employed, to shape the loose earth stirred up during cultivation.

In pre-plant emersion useage, the shaper plates are employed as would be known to the art, to ride on the tool bar 19, above the middle of bed. After growth, ie. during cultivation, they 91, are positioned behind the crowder such that a gap is left between adjacent plates 91. Positioned forwardly, but aligned with said gap would be a tunnel as described above. Thus the soil surrounding the plant, would be smoothed down, but the plant would be protected due to the fact that there is a gap between plates such that there is no impingement of the plate upon the plant.

It is seen that the shaper plate 91 constitutes a rectangular upstanding member whose vertical dimension is smaller than its horizontal dimension, 209, with one or more standards 210 secured at right angle to long dimension of said plate 91, along at least a portion of the elevation of said upstanding member 209, such as to be vertically disposed. A generally horizontal secondary member 211 is disposed along the entire length of the rearward side of upstanding member 209 a distance from the bottom of said member 209 such that 211 will abut the bottom surface of standard 290 and be secured to both 209 and 290. Standard 290 is mounted to tool bar 19 in the conventional manner with clamps as aforesaid. Reference is made to FIG. 8 wherein a shaper plate is depicted. Secondary member 211 is intended to prevent the main portion 209 from warping, since 209 is constantly under stress due to dirt impinging thereupon during operation of the rotary harrow, 1.

Plates 91 may be both vertically and laterally adjustable on beam 19 via clamps 80 so the spacing therebetween and their height may be adjustable. In this manner, tunnels 86 (FIG. 5) may be added to pass between the spacing between the plates 91. While the crowders 92 may be used without the shaper plates 91, the soil may be loose and the shaper plates 91 hold it together and make a firm, even bed top. Also, the shaper plates 91 alone may be used. Finally, although both the shaper plates 91 and crowders 92 have been disclosed as individual units, they may be integral as shown in FIG. 8 where an integral unit is shown having spaced shaper plates 94 with crowders 95 integral therewith. Such a unit may be clamped to the framework as previously disclosed, directly to the beam or tool bar 19.

The shaper plates 91 haul the dirt in between the crowders 92, and, after the plants are planted as previously disclosed, the plants are in the center and have a tunnel over them with the plates 91 going through this section to the tunnel. This sets the plants up with the proper desired spacing. That is, since the aforementioned tunnels 86 can pass between the spacing between plates 91 (e.g., 8" or so), the plants are protected. The shaper plates 91 thus pull the dirt into the tunnels 86 and shape it around on the bed, the crowders 92 meanwhile pulling the furrows back.

In certain situations it may be beneficial to employ extended shaper plates comprising 2 or more individual units butt-end-welded together with a plurality of vertical standards.

It is seen that if the harrow of this invention or the prior art unit is employed without a shaper plate 91 being attached to the tool bar 19, that the soil would remain so loose as to render bed formation somewhat difficult. With the plate of this invention, a firm even bed top is formed when employed.

Not only may the shaper plate of this invention be employed without using the crowders 92 or the tunnels 86 of the invention, but also the shaper plate and crowder can be united into one integral unit constructionwise to accomplish both desired results.

ROLLER

For a better understanding of the nature of the roller to be employed with our improved harrow, reference should first be made to FIG. 1. While this figure depicts our improved harrow with an odd number of rotors, it is seen that the roller has been enlarged lengthwise to correspond to the expanded length of the harrow. The roller there depicted is denoted as 26A. This is the standard roller disclosed in U.S. Pat. No. 3,821,989. Note that arms 25 are used to attach the roller to the harrow.

However, for the sake of economy, an operator may desire to use his previous roller which is intended for use with an even number rotor assembly harrow, for example, 18 with an odd number rotor assembly harrow, for example, 19. This can be done by use of the modified straight roller 96 as shown in FIG. 9.

If the practitioner desires to employ an enlarged, i.e. lengthened, straight roller 26A, of a size corresponding to the length of our improved harrow, it is still preferable for him to use arm extensions 25X secured to arms 25. By doing so, roller 26A is moved rearwardly, preferably about 14" such as to have access to a tool bar 19 if one is employed. (25' equivalent to 25X)

Figure 9:
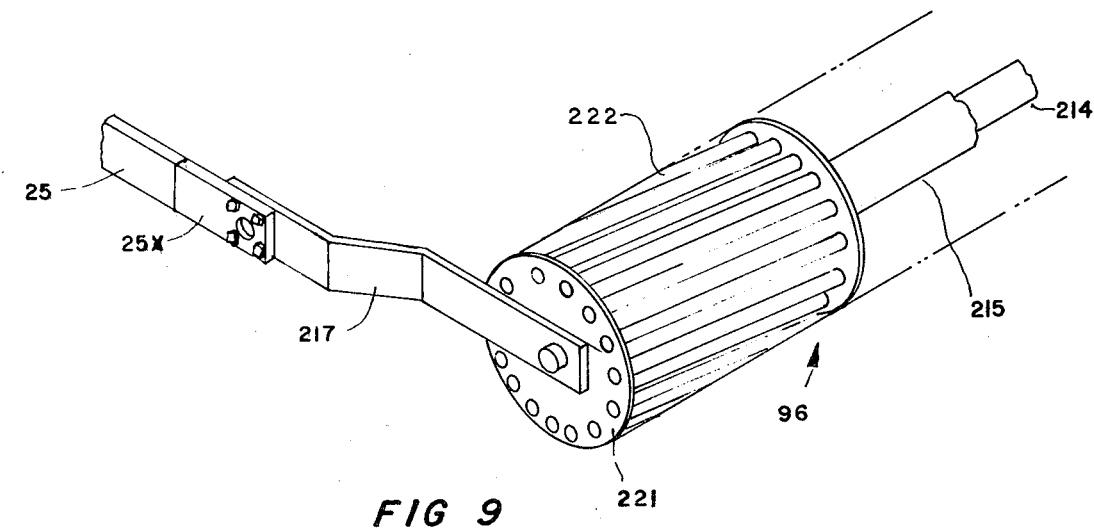
FIG. 9 is a side perspective view of an alternate roller for the harrow of FIGS. 1 and 17.

The modified roller 96 of FIG. 9 is seen to be a roller which matches in length the prior art even number rotor assembly harrow to which has been added off set mounts 217 to compensate for the length differential.

In FIG. 9 there is shown the modified straight roller of this invention. Such roller 96 is substituted for roller 26A. The primary differences are the use of a strengthening bar or tube 214 which is inserted within the main tube of the roller, 215 as shown in FIG. 2. Shown here also are the offset mounts 217, which connect the roller to arms 25X. See also FIG. 17.

The roller 96 comprises a plurality of vertical support plates 221 (colters) that are spaced apart from one another along the axial length of the roller and whose peripheries are formed with holes to receive a plurality of elongated tubular elements 222 that are entered loosely through said holes and are wound helically around the longitudinal axis of main tube 215. For further information on the basic roller structure, prior to the above mentioned modification, reference may be had to Lely and Bom U.S. Pat. No. 3,946,816, specifically at column 3, which teachings are incorporated herein by reference.

Figure 15:
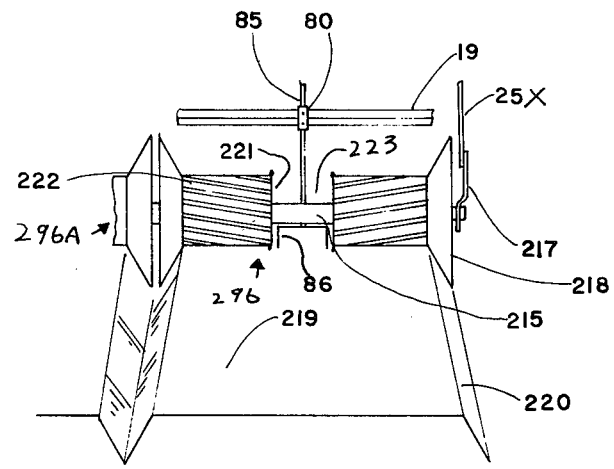
FIG. 15 is a rear perspective view of the instant cone roller.

Turning now to FIG. 15, there is shown a modified roller 296, which is employed during cultivation. Such roller 296 is seen to possess a plurality of roller sections 296A comprised of two mirror-image oriented spaced apart truncated conics 218 associated with four colters 221, grouped in pairs, with a plurality of helical members 222 wound around the longitudinal axis of the total roller 296. One central tube 215 is employed for the connection of the the plurality of roller sections, 296A. A space is left between the pair of inner colters, with no helical members, such that small plants, not shown can pass beneath the rotating but forwardly directional moving central tube 215. Such plants would pass through tunnel 86 prior to moving through open area 223. For ease of understanding, tool bar 19 is also shown in the Figure among other elements that have been previously described.

As has been alluded to earlier, new straight roller 96 is intended for installation on the improved harrow 1 of this invention. Such straight roller is seen to employ the offset mounts 217 for attachment of same to the improved harrow 1. Of course, by suitable engineering within the skill of the artisan, such improved roller could also be attached to a prior art Lely even number rotor assembly harrow if such were desired. Though to do so is an exercise of poor business judgment, since rollers of the nature of 26A of the same extension as a particular even number rotor assembly harrow are available in the marketplace.

However cone rollers as disclosed herein have never been disclosed previously to the best of our knowledge, and as such the practitioner may want to employ same with a prior art even number rotor assembly harrow. This can be done by providing arm extensions 25'. Such arm extensions would also be employed should the practitioner desire to employ a standard 26A roller upon a standard prior art hallow, with additional space between said roller and the harrow. This is of course, an after the fact conclusion, ie. subsequent to the making of the invention constituting the improved harrow of this application and the accessories intended for employment therewith. Such arm extensions 25' would be similar in configuration and would be attached in like manner as the arm extensions 216 forming a part of the instant invention.

Reference should again be made to FIG. 15. Of course, if the cone roller's length is less than that of the rotary harrow, 1, it will be necessary to employ off set mounts 217 for connection of the cone roller to the rotary harrow 1. The 217 mount, partially seen in this view attaches to cone 218 on one end and to arm 25x. The arms here are designated 25x to indicate that they have been extended longitudinally to provide a greater distance between the front of the roller 296 and the tool bar 19. The same is true for new straight roller 96 which is also spaced apart further from the tool bar than is roller 26a.

It is seen that the spacing laterally between cones is such that each cone will ride upon and smooth the respective side of the furrow 220 upon which it contacts. The flat part of the bed 219, falling therebetweeen. The artisan can determine this distance.

It is further seen that by suitable adaptation, the cone roller of this invention can be employed with rotary harrows of a different manufacturer.

The cone roller, as well as rollers 96 and 26A all operate in similar fashion, to help limit the depth of working of the soil when tines are employed in the rotors, as well as to level the soil and save moisture. In addition, cone roller 296 acts to smooth the sides of the furrow, after such have been created by the crowders.

It should be mentioned in passing, that there are many different arrangments all within the skill of art available for securing the roller to the arms 25 as in roller 26A, and to the offset mounts as in roller 96 and 296.

In the latter two, arm extensions 25X are secured as flat plates to arms 25, such as to be disposed to form a continuation of said arms 25. Extensions 25X may be overlapped and bolted or welded, or butt welded as is known to the art to arms 25.

Rollers 96 and 216 are seen to be moved rearwardly about 12 to 16 inches or so depending on the size of standards employed with the other accessories mounted on tool bar 19. By relocating the roller rearwardly, the balance of the harrow, which has a plurality of accessories mounted thereupon, is retained on the harrow, such that the roller 96, and roller 296 can perform as is desired.

Further to the mounting of new straight roller 96 and cone roller 296, it is seen that the amount of angular extension of offset mounts 217, is about five inches on each side in order to accommodate roller 96 to a rotary harrow of the aforementioned U.S. Pat. No. 3,821,989 which has been modified in accordance with the teachings of this invention, to a greater width.

Whereas new straight roller 96 includes as one element therein the offset mounting system seen in FIG. 9 with a standard "beefed up" roller 26A, such is not the case with cone roller 296. This latter may be employed on a regular Lely rotary harrow if desired, without the offset mounting system of FIG. 9, or with such system on the improved harrow of this invention, or with some other rotary harrow known to the art. For cone roller 296, the mode of attachment is within the skill of art, and is dependent upon the harrow with which it is to be employed.

In operation in the field, it is seen that two passes of the improved harrow of this invention will carry out the desired functions of the rollers. First, roller 96 is is used in the formation of the beds. This is then removed, and replaced by the cone roller 296. The tunnels 86 & 91 shaper plates are installed such that the tunnels are provided forwardly of the space between adjacent shaper plates. A second pass is then carried out. It is seen that the first pass is in the pulling of the beds while the second pass is for cultivation after the emergence of plants.

NOVEL HITCH

Figure 10:
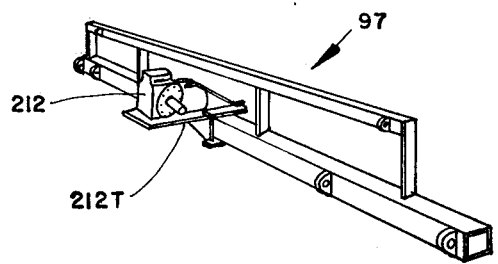
FIG. 10 is a perspective view of a hitch for coupling together a pair of harrows as in FIGS. 1–3.

Such a side by side relationship can be accomplished by mounting the novel hitch 97 as shown in FIG. 10 to both harrows. Hitch 97 is seen to include a suitable gear box means 212 mounted on support 212T which receives the power from the tractor and disperses the power to each harrow's drive means.

Turning momentarily to the tine configuration employed in our improved harrow, it is seen that the prior art rotary harrows as manufactured by Lely of the Netherlands, and which cannot be employed for row crop close cultivation, was one of all long tines or one of all short tines 11", as per FIG. 2, for all of the rotor assemblies. See FIG. 3. We on the other hand, employ a combination of short and long tines for cultivation purposes. Two, four or six long tines 11' are employed per rotor assembly 300, in front of each crowder 92 or 95, mounted on tool bar 19; and we use two, four or six tines 11" per rotor assembly 300 of a relatively shorter length on top of the beds, 219. The difference in length between the short and long tines is governed by the altitude of the side of the bed, 220. Any tines that are suitable for mounting in rotor assembly 300 may be employed in our invention, such as those disclosed in the aforesaid U.S. Pat. No. 3,821,989 or in U.S. Pat. No. 3,783,948 among others.

The configuration discussed above, is best understood by reference to FIG. 16, parts A and B. FIG. 16A is an overhead simplified view of a portion of the instant improved harrow, showing the presence of 19 rotor assemblies, 300. FIG. 16B is a rear view, with the roller removed of harrow 1. Note the spacing for 19 rotor assemblies, but in fact only 16 are present completely. While the gearing for assemblies 4,15 and 17 are present, but not viewable in this Figure, tine holders 9, and integrated parts 16,2, among others have been removed.

Forward of assemblies and in axial alignment therewith if present are tunnels 86. Note the presence of short tines 11" at the top of the bed, 219, and long tines 11' along the sides of the bed 220.

For the purpose of this application it is seen that the rotor assembly 300, comprises the soil working members 4 and the gearing and other parts associated therewith, per FIG. 3.

Generally, a rotary harrow is used as a secondary tool after the farmer uses a plow or a chisel. It is usually used to go in and tear down the large clods of earth. It is primarily used throughout the world as a secondary tool to make a seed bed on a level ground, i.e. no beds.

Applicants recognize that the Lely et al U.S. Pat. No. 3,821,989 indicates that it is within the scope of that invention to employ other numbers of soil working members (rotor assemblies) to provide rotary harrows of differing working widths. See Column 1, line 47 et seq of said patent. Applicants are, however, quite familiar with the fact that all of the harrows built in accordance with the teachings of that patent and other Lely patents provide an even number of rotor assemblies. In the past is was always believed necessary to have the same amount of rotors on both sides of the center of the machine. In the prior art unit Figure 1, it is seen that the power to be delivered from the main gear box must go laterally to the plurality of rotor assemblies on either the right side of the harrow or on the left side of the harrow. It was not believed possible to be able to center drive the harrow. The main reason for the off centre drive of the prior art harrow was to avoid what is known in the art as side draft. The term side draft is intended to mean a lateral movement of the harrow in the soil. We have now found that indeed a center drive of the machine is possible such that we now have in addition to the same number of rotor assemblies and their respective drive gears on each side of the main gearbox, an additional rotor assembly and its appropriate gear directly beneath the main gear box.

In the prior art unit a ring gear is connected to an even numbered rotor assembly counting left to right, and to the main drive system, this latter and its even numbered rotary assembly then transmits power to both sides of the rotary harrow. By definition, it is seen therefore, for example, that in an 18 rotor assembly unit the ring gear and the main power system would be attached to the tenth rotor assembly counting from left to right. Thus there would be nine rotors to the left and eight rotors to the right of the rotor being driven by the main gear. As has been indicated previously, this has given rise to a large amount of vibration caused by the uneven distribution of power. While the directions left and right have been related previously, the power distribution could be reversed with the odd number on the right and the even on the left. In these prior art harrows, the center of the machine is seen therefore, to lie between the ninth and tenth rotor assemblies. We, however, upon the addition of the 19th rotor assembly, alter the center of the machine from between two rotor asemblies, to the now central rotor assembly. Thus in a nineteen rotor assembly, the pivot point is now situated directly upon the center of the 10th rotor assembly, i.e. power unit 400, which is the same one that receives the power in the prior art unit, as well as in our device. We therefore drive an even amount of gears on each side of the center of the machine.

The three point hitch 301 in the prior art unit as per FIG. 1 of this application and FIG. 1 of U.S. Pat. No.

3,821,989 incorporated herein by reference previously, is positioned centrally with respect to the harrow. However, as seen in that patent, the drive line is mounted off center of the machine, directly above one of the rotor assemblies as discussed previously. In our improved unit, we mount the hitch laterally such that it is in the same axis vertically according to the direction of motion (arrow A) with the power line from the tractor. It is seen, therefore, that from a top view that the center of the hitch 301 would be in direct alignment with the power gearbox. Reference is made to FIG. 17 which shows the drive line directly beneath the hitch tie bar.

The three point hitch 301, employed in the prior art unit, is also employed with our invention. Thus configurationwise, it is shown in both FIGS. 1 and 17. However, as is explained elsewhere herein, the relative mounting location of same has been changed for this invention. Thus a comparison should be made of FIGS. 2 and 17. Preferably, the hitch 301 is moved over about 4 inches to center it with respect to the extended harrow of this invention. It is within the scope of this invention to increase the number of tie rods 49 from the shown four, to six or more.

Prior art machines as indicated previously have been employed on level ground, and when so doing, tines of equal length were employed. Therefore, if such a harrow were attempted to be used on beds, it would be found that cultivation would be impossible. Therefore, as part of our improved harrow, it is seen that we employ for cultivation purposes, tines that are of two sizes, as also previously discussed. The short ones being employed on the top of the bed and the long ones in the furrow areas between the beds. Reference is again made to FIG. 16B.

It is to be seen that one must consider the relationship between the width of the beds that he is working upon with respect to the overall length of the harrow, when choosing a particular length harrow. The practitioner should first correlate the overall length of his harrow, i.e., the total number of rotor assemblies 300, present with the width of the furrows he is working. The optimum correlation of same, will result in the elimination of an unworked guess furrow or guess bed. Without working such guess bed or furrow, weeds will grow there. The term "guess" is used to indicate a tolerance zone dimension which may be either on the top of the bed or in the furrow to compensate for errors by the operator of the equipment.

In view of the sizes of beds employed, especially in California; namely 30 inch, and 60 inch primarily, depending upon the crop to be grown, it has been found that this above mentioned correlation is best carried out by use of an odd number rotor assembly 300, machine. Thus a 19 rotor assembly unit can successfully cultivate six 30 inch beds or three 60 inch beds when the accessory tunnels and crowders are employed with same; but a prior art 18 rotor width machine can not so cultivate. This is due to the relative location of the harrow vis a vis the tractor, and the relative location of both tractor in combination with the harrow vis a vis the beds.

With an 18 rotor prior art machine, even with tunnels and crowders of this invention added thereto, plants on beds would be impinged upon by the apparatus, or the tractor's wheels would not successfully straddle the proper width of the plurality of beds even if the harrow were properly aligned vis a vis the beds. With our 19 rotor machine these problems are avoided.

Specifically, the 180 inches of 6 times 30 inch or 3 times 60 inch beds is insufficient width for the operator of the equipment to travers while working. He requires a small amount of tolerance zone on each side when making a pass with the equipment. If he tries to employ an 18 rotor machine for cultivating these beds, he would find that there was no tolerance zone available, in addition to the aforementioned problems. Thus it is seen that the unobvious requirement of an uneven number of rotor assemblies for cultivation is a reality.

We have found that a twenty five rotor machine is capable of cultivating a plurality of beds that a twenty four rotor unit machine cannot.

It is seen in retrospect that we have provided here a multipart invention which reduced to fundamentals is seen to comprise an improved rotary harrow and a plurality of accessories for same.

The improvement to the prior art rotary harrow is seen to comprise the addition of one additional rotor, such that the former even number rotor assembly units can now be used for row crop cultivation in California the provider of about 10% of this country's fresh produce. The other unobvious results obtained from the improved harrow, are an equalization of power to both sides of the unit, whereby vibration is significantly reduced. The other inventive aspects of our improved harrow include the use of the two sizes of tines, short and long, as discussed with respect to FIG. 16; and the use of the sideshields to retain the dirt in the working locale.

The improved harrow as described above is rendered even more useful by the inclusion of the accessories therefore, such as the crowders, and the tunnels, and the new straight roller 96 as well as the cone roller 296, and the new shaper plates.

It can be seen that we have described a harrow which prepares a uniform and complete seedbed in one pass from flat ground. Guess rows are worked completely for seedbed uniformity across the full width. This results in better germination and cultivation capability.

By extending the rear roller support area, access is gained to the rear tool bar, and the ability to use a hand tool storage box that may be mounted on the harrow as is done in the field is increased. This therefore is the fourth segment of our improved rotary harrow.

It is also seen that our improved cultivation capable rotary harrow can be employed for still other purposes. Thus, by mounting a spray boom on the rear tool bar, chemicals may be incorporated into the aggresized soil. The unit also lends itself nicely to combining cultivation with lay-by herbicide addition at speeds as high as 5 M.P.H.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim as our invention:

1. A rotary harrow for row crop seed bed preparation and cultivation thereof having a main frame, drive means mounted on the frame, said drive means being in driving engagement with a plurality of soil-working members rotatably journalled in said frame, said members being mounted to turn about upwardly extending axes, said soil-working members comprising rotor assemblies, the distance between the first and last of said assemblies defining a work zone; a supporting structure mounted on said frame having coupling means for coupling the same to a tractor or the like; and a front tool bar disposed parallel to said frame, the improvement which comprises:

the plurality of rotor assemblies being an odd total number of said assemblies, said drive means including a gear box mounted over one of said assemblies, with the remainder of said assemblies having an equal number extending laterally on opposite sides of said gear box;

wherein each of said rotor assemblies includes a tine holder, a plurality of downwardly extending tines mounted on each holder, the tines on some of said holders being greater in length than the tines on the remaining holders, said tines being interchangeably and removably mounted with respect to said holders, the assemblies having longer tines mounted therein being positioned along said frame whereby said longer tines engage the soil of a furrow and the ends of a raised bed, and the assemblies having shorter tines mounted therein being positioned along said frame whereby said shorter tines engage the soil of the interior of said bed;

a rear tool bar which is mounted longitudinally along said frame, upwardly and rearwardly from said rotor assemblies;

a pair of side shields mounted on opposite sides of said harrow extending in a direction generally normal to the frame of said harrow, said side shields being adapted to contain all dirt worked by the tines between the extremities of the harrow, said side shields including a flange member abutting against each of said side shields extending in a direction oblique to the plane of each of said side shields, thereby forming a V-shaped pocket opening in the direction of operative movement of said harrow, thereby adapting said side shields to direct any dirt impacting upon said shields back to the work zone;

at least one shaper plate for smoothing the top of a bed, comprising: an elongated flat generally vertical upstanding plate having a generally horizontal reinforcing member disposed along the length on one side thereof spaced up from the bottom of said plate and normal thereto; and vertically depending means connected to said upstanding plate for mounting said shaper plate to the rear tool bar;

a plurality of spaced apart crowders generally longitudinally aligned with said longer tines, each having a triangular shaped body portion comprising two essentially vertical rearwardly diverging face panels for pushing dirt aside in said furrows, and means attached to said body portion for mounting said crowders on said rear tool bar.

2. In the harrow of claim 1 including a plurality of linearly aligned spaced apart shaper plates each separated by tunnel forming means for protecting plants during cultivation.

3. The subject matter of claim 1 further including:
a tunnel forming device for forming a tunnel over plants when cultivating a field comprising:
a main top support plate; and
a pair of downwardly extending generally vertical trapezoidally shaped side plates fixedly mounted on opposite sides of said support plate by flanges depending inwardly and normal therefrom, thereby providing a tunnel formed by said top plate and between said side plates;
the flanges of said side plates being mounted to said top plates, wherein said side plates have a lower leading edge sloping upward and rearwardly and are laterally adjustable with respect to said top plate for varying the spacing therebetween;
and wherein the front edge of said plates is rounded.

4. The subject matter of claim 1 further including:
a conical roller which comprises:
a plurality of spaced apart vertical support plates in pairs spaced apart along the axial length of a central shaft, the peripheries of which plates are formed with circumferentially spaced holes to receive a plurality of rods around the longitudinal axis of said central shaft;
a plurality of rods being disposed between a first pair of said plates and between a second pair of said plates, there being no rods joining the first pair and the second pair of said plates, said rods being spaced from said central shaft;
a pair of truncated conical discs being mounted in mirror image converging relationship on the outer extremity of each of said pairs of vertical support plates.

5. The subject matter of claim 3 further comprising:
a conical roller which comprises:
a plurality of spaced apart vertical support plates in pairs spaced apart along the axial length of a central shaft, the periperies of which plates are formed with circumferentially spaced holes to receive a plurality of rods around the longitudinal axis of said central shaft;
a plurality of rods being disposed between a first pair of said plates and between a second pair of said plates, there being no rods joining the first pair and the second pair of said plates, said rods being spaced from said central shaft;
a pair of truncated conical discs being mounted in mirror image converging relationship on the outer extremity of each of said pairs of vertical support plates.

6. In the harrow of claim 1, wherein 19 rotor assemblies are provided.

7. In the harrow of claim 1 wherein said shaper plates are both vertically and laterally adjustable.

8. A tunnel forming device for use on a rotary harrow for forming a tunnel over plants when cultivating a field comprising:
a main top support plate; and
a pair of downwardly extending generally vertical trapezoidally shaped side plates fixedly mounted on opposite sides of said support plate by flanges depending inwardly and normal therefrom, thereby providing a tunnel formed by said top plate and between said side plates;
the flanges of said side plates being mounted to said top plates, wherein said side plates have a lower leading edge sloping upwardly and rearwardly and are laterally adjustable with respect to said top plate for varying the spacing therebetween;
and wherein the front edge of said plates is rounded.

9. In the device of claim 8 including a support bracket pivotally connected to said top plate extending generally vertically upwardly from said top plate opposite the direction of said side plates.

10. A conical roller for use with a rotary harrow which comprises:
- a plurality of spaced apart vertical support plates in pairs spaced apart along the axial length of a central shaft, the peripheries of which plates are formed with circumpherentially spaced holes to receive a plurality of rods around the longitudinal axis of said central shaft;
- a plurality of rods being disposed between a first pair of said plates and between a second pair of said plates, there being no rods joining the first pair and the second pair of said plates, said rods being spaced from said central shaft;
- a pair of truncated conical discs being mounted in mirror image converging relationship on the outer extremity of each of said pairs of vertical support plates.

11. In the roller of claim 10 wherein the rods are helically wound.

12. In the roller of claim 10 wherein the helical rods are tubular.